INVENTOR.
Frank Sportolari
BY William B. Jaspert
ATTORNEY.

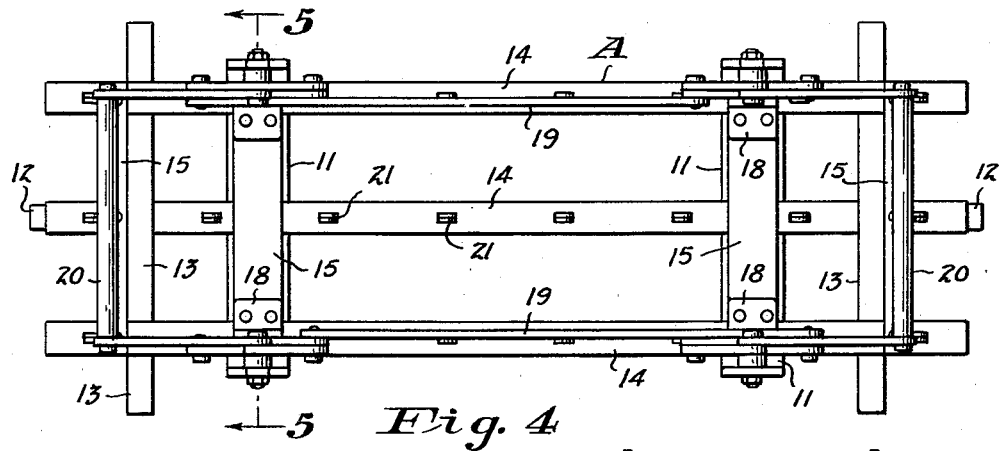
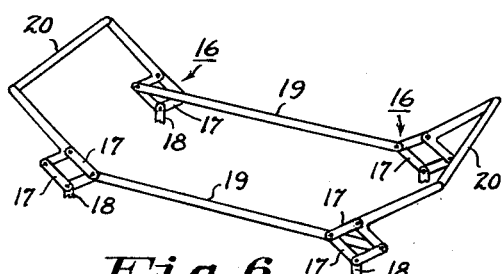
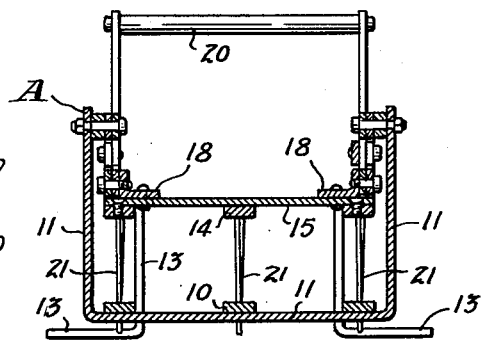
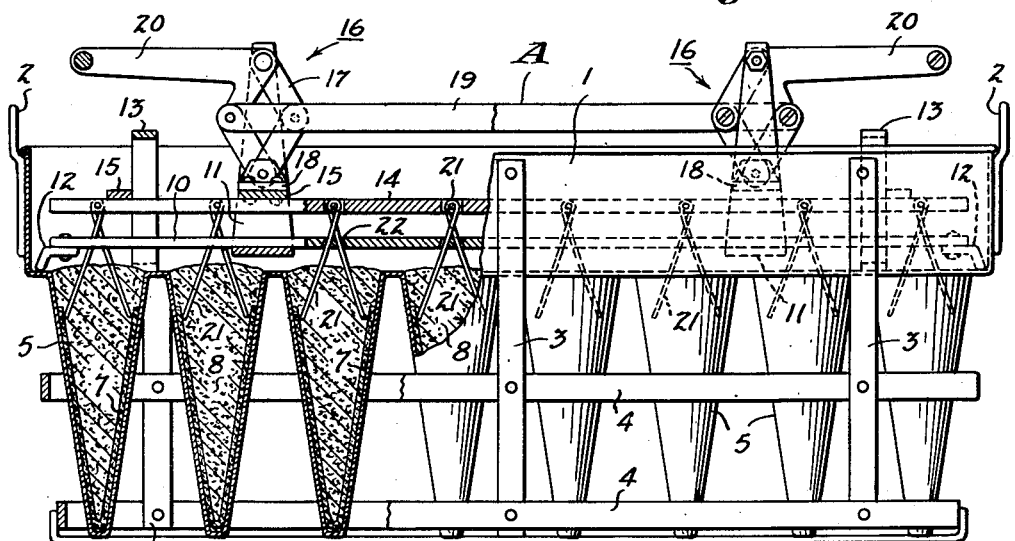

Nov. 16, 1943.  F. SPORTOLARI  2,334,654
METHOD OF FORMING COATED FROZEN CONFECTIONS
Filed May 6, 1941  3 Sheets-Sheet 3

INVENTOR.
Frank Sportolari
BY William B. Jaspert
ATTORNEY.

Patented Nov. 16, 1943

2,334,654

UNITED STATES PATENT OFFICE 2,334,654

METHOD OF FORMING COATED FROZEN CONFECTIONS

Frank Sportolari, Pittsburgh, Pa.

Application May 6, 1941, Serial No. 392,083

2 Claims. (Cl. 107—54)

This invention relates to new and useful improvements in the method of making frozen confections, and more particularly for filling and coating edible ice cream cones.

It is among the objects of the invention to provide a method of forming a plurality of chocolate coated cones simultaneously in an expedient and economical manner, and with complete sanitation, as it eliminates the need for handling the individual cones.

Frozen confections of the type herein referred to have heretofore been produced by handling each cone individually. By the hand method the cone was filled with the substance to be frozen and charged in racks which were placed in a freezing room. After freezing they were partially dipped in a coating solution and then rolled in grated nuts or the like. Because of the time lost in handling the cones to fill them and transfer them to a freezing chamber, it was necessary to coat the inside and outside of the cone with a chocolate coating containing a fatty substance to render the cone moisture repellant, to prevent its becoming soggy after the substance to be frozen is placed therein. Such pre-coating is not necessary in carrying out the hereinafter disclosed method because of the rapidity of filling, freezing and transferring the filled cones.

The invention will become more apparent from a consideration of the accompanying drawings constituting a part hereof, in which like reference characters designate like parts, and in which:

Fig. 4 is a top plan view of the rack of Fig. 3;

Fig. 5 is a sectional view taken substantially on lines 5—5 of Fig. 4;

Fig. 6 is a fragmentary view, in perspective, of a portion of the rack shown in Figs. 3 to 5;

Fig. 7 is a side elevation, partially in cross section, of the rack placed on the mold of Figs. 1 to 3, with parts broken away to illustrate the operations thereof;

Figure 1:
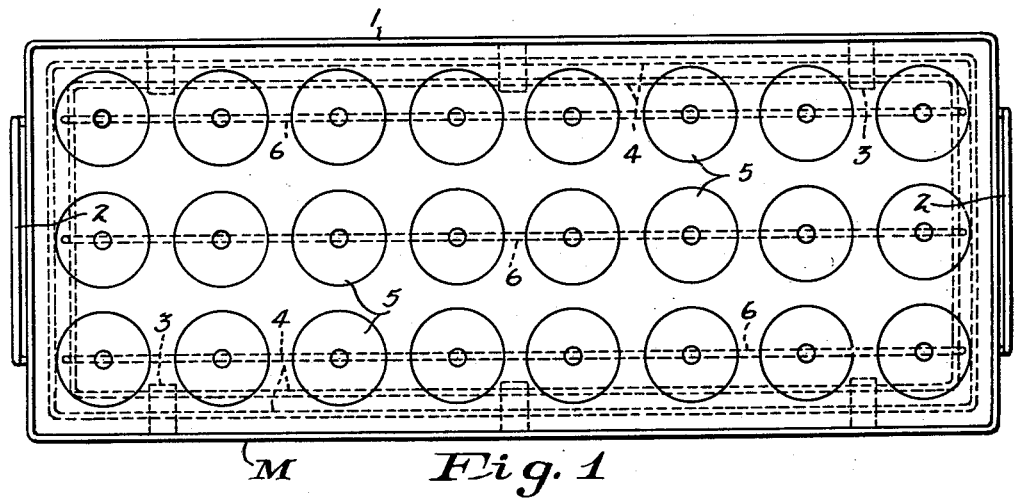
Figure 1 is a top plan view view of a multiple mold embodying the principles of this invention.
Figure 2:
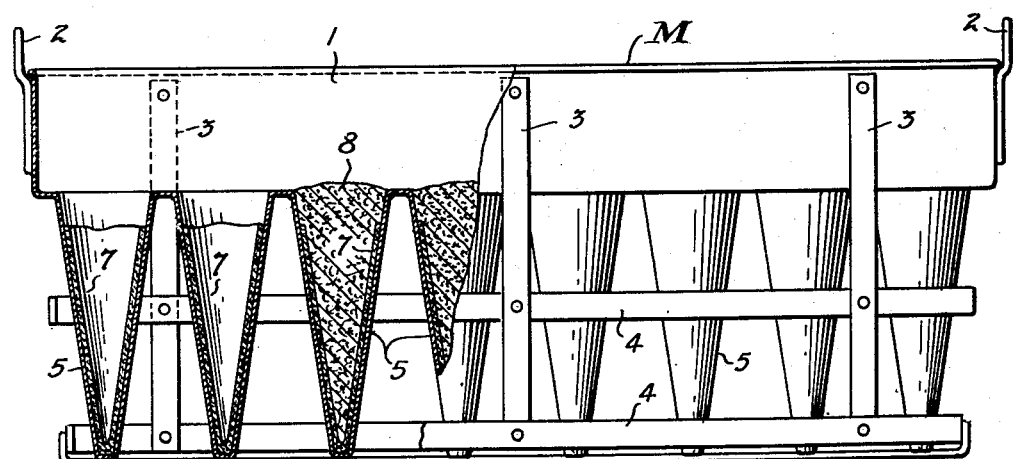
Fig. 2 is a side elevation of the mold shown in Fig. 1, partially in section and with portions of the mold cut away.

With reference to Figs. 1 and 2 of the drawings, the structures therein illustrated comprise a mold M in the shape of a rectangular pan 1, having handle portions 2 and having a metal basket constituted by hanger straps 3 and horizontal straps 4 attached thereto. A plurality of individual conical-shaped molds 5 extend from the bottom of the pan 1 and are secured to runners constituting a base 6, as shown in Figs. 1 and 2.

Open ended containers 7 such as ice cream cones, which are made of an edible frangible material, are placed in the molds 5 and are filled with a suitable comestible substance, indicated by the numeral 8, such as a plastic ice cream mix or the like. The cones with the substance therein are subjected to a low temperature to chill the container and solidify or freeze the substance. When the mold M is made of metal or some other heat transmitting material, the confections may be readily and economically chilled by partial immersion of the mold in a refrigerated brine solution, such as is utilized in many refrigeration units. The confections may also be chilled by placing the mold in a refrigerated cabinet or chamber.

After the filled cones are suitably frozen, they are removed from the multiple molds by means of a gripper rack or impaler A, shown in Figs. 4 to 7 inclusive, and which comprises a body portion or member composed of a plurality of flat bars 10 disposed in parallel relation and secured together by attachment to the crosspieces of U-shaped brackets 11. In the construction shown in the drawings, three of the bars 10 are employed and are held in place by a pair of the brackets 11, which are spaced apart and located near the ends of the bars 10.

The body of the impaler is provided with suitable support means or chairs 12, which extend in an outward direction from the ends of the bars 10, so that the impaler may be supported at its ends in the pan 1 of the mold M and will overly the individual molds 5. The supports 12 also act as guides for the ends of the impaler as it is being moved into and out of the pan 1 of the mold. Additional supports for the body of the impaler are provided by handle members 13, the ends of which extend outwardly from the sides of the body in substantially the same plane as the supports 12, and act as guides for the sides of the body as well as supports therefor. The intermediate portions of the members 13 extend upwardly above the bars 10 of the body to provide handles for the impaler, as may be best seen in Fig. 8.

Above the body of the impaler A is provided suitable means for carrying the impaling elements which, in the construction shown in the drawings, comprises three flat bars 14, similar to the bars 10, and disposed in superposed relation to the bars 10. The bars 14 are secured to crossbars 15, so that the bars 14 move and act as a unit.

The carrying means for the impaling elements is connected for vertical movement toward and away from the body of the impaler through toggle mechanisms, two of which are at each side of the impaler, and are indicated generally by the numeral 16. These toggle mechanisms include toggle links 17 which are pivotally connected to each other, the lower end of each toggle being connected to a bracket 18 carried by the ends of two of the crossbars 15 of the means carrying the impaling elements, and the upper end of each toggle being connected to the upwardly extending free ends of the U-shaped brackets 11 to which the bars 10 are secured. The two toggles at each side of the impaler are interconnected by links 19, so that all the toggles operate simultaneously. As may be seen in the diagrammatic perspective of the toggles in Fig. 6, one of the links 19 connects the inside of one toggle to the outside of the other toggle on the same side, while the other link 19 connects the outside of the toggle which is across from the toggle connected on the inside to the inside of the toggle across from the toggle connected at its outside. Handles 20 extend transversely across from the two toggle mechanisms at each end of the impaler and provide a means to actuate the toggles and move the impaling elements toward and from the impaler body.

At spaced locations along the bars 14, suitable impaling elements 21 are secured, which in the present instance are formed wires mounted in apertures in the bars 14 and having two free ends depending from the bars and crossing each other at a short distance beneath the bars. These crossed wires extend downwardly to the bars 10 and are received in suitable guide slots 22 provided in the bars 10, the number and spacing of the bars 10 and 14, and the number and spacing of the impaling elements 21 corresponding to the number and spacing of the individual molds 5 of the mold M. The guide slots 22 are flared in an outward direction so that as the bars 14 and the impaling wires 21 are moved toward the bars 10, the ends of the wires 21 are directed downwardly and outwardly to impale the solidified comestible substance 8 at the open end of the cones 7, and grippingly engage the confections to lift them from the molds 5.

Figure 3:
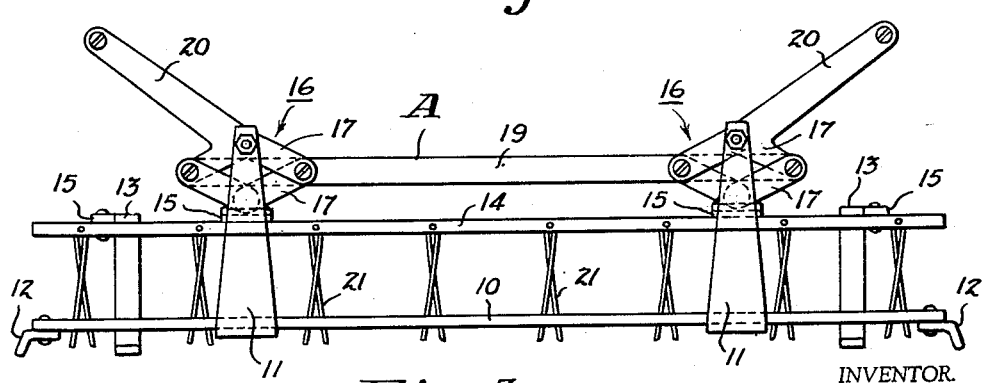
Fig. 3 is a side elevational view of a gripping and handling rack.
Figure 8:
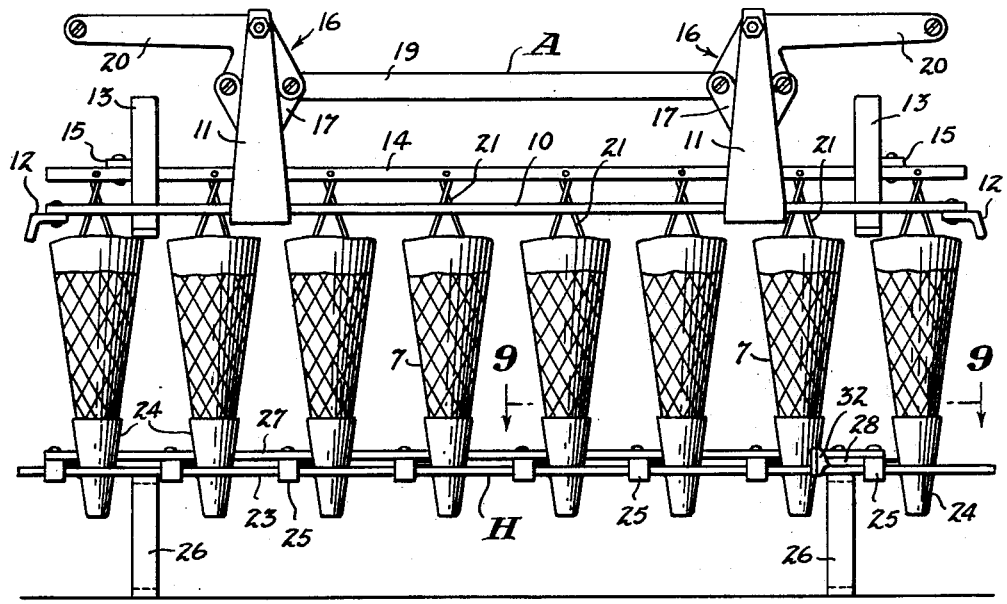
Fig. 8 is a side elevational view, partially in section, of an assembly of frozen cones and a plurality of gripping and handling racks.

Figs. 3 and 5 show the impaler A with the wires 21 withdrawn to their normal or inoperative position. Figs. 5, 7 and 8 illustrate the rack with the handles 20 pulled outwardly and downwardly to actuate the toggles and extend the points of the impaling elements 21, causing them to grippingly engage confections. By simply raising the rack A by the handles 13, the confections are simultaneously removed from their molds, as shown in Fig. 8, and are placed on a second gripping rack or holder H, shown in Figs. 8 to 11, which grips the cones 7 on their exterior in the region of their closed ends.

The holder H comprises a body portion 23 having apertured cone holding sockets or supports 24 secured thereto at suitably spaced intervals corresponding to the spacing employed in the mold M and the impaler A.

Figures 9, 10, 12:
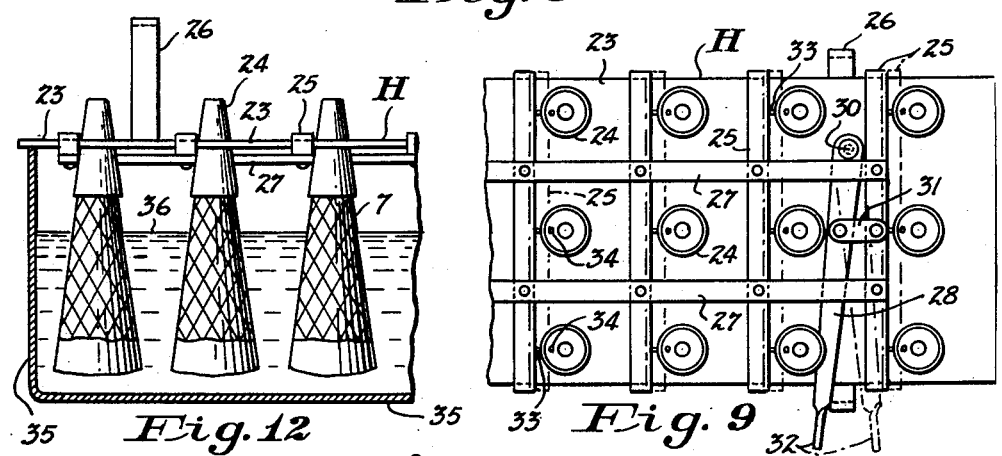
Fig. 9 is a cross sectional view, taken substantially on line 9—9 of Fig. 8.
Fig. 10 is an end elevational view of the cone gripping rack.
Fig. 12 is a fragmentary elevational view, partially in section, illustrating how the cones may be coated by dipping.

A plurality of crossbars 25 are mounted on the body 23 transversely thereof for sliding movement therealong, which mounting may be conveniently accomplished by bending the ends of the bars 25 around the side edges of the body 23, as may be seen in Fig. 10. Also secured to the body are a pair of supports or legs 26 to raise the body a suitable distance from its plane of support.

The crossbars 25 are interconnected by a plurality of connecting bars 27, which extend longitudinally of the body and cause all the bars 25 to move simultaneously. Actuation of the bars 25 is accomplished by a lever 28 pivotally mounted on the body at the location indicated by the numeral 30 in Fig. 9, and connected to one of the bars 25 by a link 31. The lever 28 extends beyond the side of the holder H and terminates in a finger engaging tab or handle 32.

Figures 11, 13:
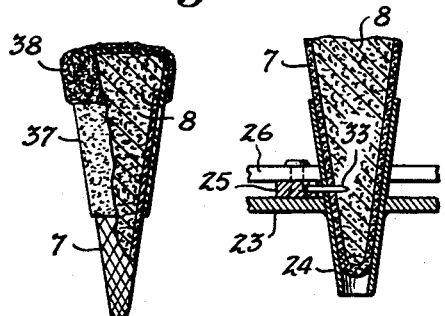
Fig. 11 is an enlarged fragmentary sectional view showing how the cone may be gripped by the rack shown in Figs. 8 to 10.
Fig. 13 is an elevational view, partially in section, of a completed confection made according to the present invention.

Each of the bars 25 is disposed adjacent a row of the supports or sockets 24 and is provided with gripping means to hold the cones in the holder H with sufficient security so that the holder may be inverted. Fig. 11 shows a desirable form of gripping means, namely, a plurality of pins 33 secured to the bars 25, one for each of the sockets 24, said pins being extensible through apertures 34 disposed in each of the sockets 24 to engage and firmly secure confections supported in the sockets. To assure that all the confections are securely gripped, it is desirable that the pins actually pierce the walls of the cones and project into the solidified comestible substance therein, as illustrated in Fig. 11.

When the confections are removed from the mold M by the impaler A and transferred to the holder H, as is the condition shown in Fig. 8, the tab or handle 32 is moved from its full line position in Fig. 9 to its dotted outline position of Fig. 9 to advance the bars 25 toward the sockets 24 and project the pins 33 through the apertures 34 into contact with the confections. Then the handles 20 of the impaler A may be moved upwardly and toward each other to retract the impaling wires 21 from the confections and the impaler A is free to be used in removing the next group of confections from their mold M.

The holder H is lifted by its supports 26, which serve as handles, and inverted so that the confections may be held with the open ends of the containers directed downwardly. In this position the confections may be readily lowered into a suitable container, indicated by numeral 35 in Fig. 12, having therein an edible coating substance 36, such as for example melted chocolate. The coating may be applied by the above dipping process to cover only the solidified substance in the cone, or it may be used to coat as much of the cone as desired. One convenient way of coating the confections uniformly is by maintaining a constant level of the coating substance 36 in the container 35, and then positioning the holder H on the container 35 so that the edge portions of the body 23 rest on portions of the container, such as the top edges of the container walls.

After the confections have been coated with the substance 36, a layer of another edible substance may be applied thereto, such as for example fragments of nut meats or the like. The completed confection is placed in a suitable package and stored, preferably in a refrigerated compartment, ready to be dispensed to consumers. Fig. 13 shows a confection made in accordance with the present invention, the cone 7 containing solidified ice cream with a coating 37 of chocolate applied thereto and topped by a sprinkling of nut meats, indicated by the numeral 38.

The above described mechanism is used in the forming of frozen confections, as follows:

The mold M is placed in an upright position, as shown in Fig. 2. The cones, which are of a crisp edible wafer substance, are dropped in the molds 5 and the substance to be frozen is then poured into the individual cones. The mold M is then subjected to rapid refrigeration by standing the mold in a brine solution or by placing it in a refrigerated compartment. The frozen cones are then removed from their molds by gripping the stationary handles 13 and placing the impaler A in the bottom of the mold pan 1, as shown in Fig. 7, with the toggle handles 20 in their raised position, as shown in Fig. 3. In this position the impaling elements 21 are retracted and are disposed above the contents of the molds 5. By depressing the toggle handles 20, the impaling wires are moved downwardly and outwardly, while they move into the frozen substance 7 with which the cones are filled. By again gripping the handles 13 and lifting the impaler A out of the mold pan 1, all of the frozen units will be simultaneously removed from their molds. To facilitate the removal of the cones, the mold may be dipped in warm water for an instant, causing defrosting of the walls of the mold and permitting the removal of the cones therefrom.

When the impaler A is lifted out of the mold with the frozen cones suspended from the wires 21, it is placed over the cone holder H, with each cone disposed in one of the sockets 24 as shown in Fig. 8. The handle 32 is moved to cause the pins 33 and bars 25 to advance, so that the pins engage and securely hold the cones.

The gripper rack A is then removed by actuating the toggle handles 20 to withdraw the impaling wires 21 from the frozen confections, and the holder H is then inverted to the position shown in Fig. 12, with the large portions of the cone depending vertically, in which position they are dipped in a bath of chocolate, which congeals instantly on the outer surface of the cone, to coat the cone and the substance therein, as illustrated in Fig. 13.

When the cones are removed from the coating, they may be further dipped in granulated nuts, designated by the numeral 38 in Fig. 13. The holder H is removed by operating the lever 28 to release the confections for packing.

It is evident from the foregoing description of this invention that the apparatus and method therein disclosed provides an economical and sanitary means of making frozen ice cream cones with a chocolate coating, trimmed with comminuted or shredded nuts, which can be placed in a refrigerated compartment to be dispensed without the need of handling with unsanitary utensils and in unsanitary surroundings, and without the hands of a person coming in contact with any part of the frozen confection.

By means of the hereinbefore described method, the chilling of cones is much more rapid than any heretofore employed, so that the crisp, baked cones are prevented from becoming soggy.

By the herein described method of simultaneously handling a large number of cones and by the rapid freezing of the filling substance, it is not necessary to coat the inside and outside of the cone before placing it in the mold, although this may be done if desired. The elimination of this step, however, effects a substantial saving both in the use of materials and in the additional time needed for the dipping and handling operations. If desirable, the cones may be placed in the molds and the molds inserted in a brine solution preliminary to filling them with the substance to be frozen. In this manner the filler will freeze by contact with the inner wall of the cone, which absolutely assures the prevention of moisture absorption by the wafer cone substance.

This application is a continuation-in-part of my application Serial No. 291,356, filed August 22, 1939, for apparatus and method for forming coated frozen confections.

While the above apparatus and process have been described in connection with the confection shown in Fig. 13 of the drawings, it may be seen that slight variations in the process and apparatus may be made to handle other similar confections without departing from the spirit of the present invention.

Although one embodiment of the invention has been herein illustrated and described, it will be evident to those skilled in the art that modifications may be made in the details of construction or in the steps of the method without departing from the principles herein set forth.

What I claim is:

1. The method of making confections which comprises supporting a group of articles of generally conical form in substantially parallel relation with their large ends uppermost, each of the said articles consisting of an edible frangible ice cream cone filled substantially to its open top with comestible material that has been congealed therein, simultaneously inserting impaling elements downwardly into the congealed material within the frangible cone, lifting the impaling elements with the articles impaled thereon, gripping the small ends of said articles and holding said articles in spaced relation, releasing said articles from said impaling elements and dipping the large ends of said articles in a melt to coat the same while they are being held by their small ends.

2. The method of making confections which comprises supporting a group of articles of generally conical form in substantially parallel relation with their large ends uppermost, each of the said articles consisting of an edible frangible ice cream cone filled substantially to its open top with comestible material that has been congealed therein, simultaneously inserting impaling elements downwardly into the congealed material within the frangible cone, lifting the impaling elements with the articles impaled thereon, inserting the small ends of said articles in individual spaced holders, fastening the small ends of said articles to said holders, releasing the articles from said impaling elements, inverting said holders, and dipping the large ends of said articles in a melt to coat the same.

FRANK SPORTOLARI.